US009269982B2

(12) United States Patent
Sahu et al.

(10) Patent No.: US 9,269,982 B2
(45) Date of Patent: Feb. 23, 2016

(54) FLOW CELL STACK

(75) Inventors: Saroj Kumar Sahu, Mountain House, CA (US); Suresh Kumar Surapalan Nair, Fremont, CA (US)

(73) Assignee: IMERGY POWER SYSTEMS, INC., Fremont, CA (US)

( * ) Notice: Subject to any disclaimer, the term of this patent is extended or adjusted under 35 U.S.C. 154(b) by 149 days.

(21) Appl. No.: 13/350,424

(22) Filed: Jan. 13, 2012

(65) Prior Publication Data

US 2012/0208061 A1 Aug. 16, 2012

Related U.S. Application Data

(60) Provisional application No. 61/432,541, filed on Jan. 13, 2011.

(51) Int. Cl.

| | |
|---|---|
| ***H01M 8/08*** | (2006.01) |
| ***H01M 8/18*** | (2006.01) |
| ***H01M 8/02*** | (2006.01) |
| ***H01M 8/04*** | (2006.01) |
| ***H01M 8/24*** | (2006.01) |

(52) U.S. Cl.

CPC ............ *H01M 8/188* (2013.01); *H01M 8/0284* (2013.01); *H01M 8/04276* (2013.01); *H01M 8/248* (2013.01); *Y02E 60/528* (2013.01); *Y10T 29/49108* (2015.01)

(58) Field of Classification Search

CPC .... H01M 8/248; H01M 8/0248; H01M 8/188
USPC .................................................. 429/105, 471
See application file for complete search history.

(56) References Cited

U.S. PATENT DOCUMENTS

| | | | | |
|---|---|---|---|---|
| 3,996,064 A | | 12/1976 | Thaller | |
| 4,192,910 A | | 3/1980 | Giner et al. | |
| 4,270,984 A | | 6/1981 | Giner et al. | |
| 4,362,791 A | | 12/1982 | Kaneko et al. | |
| 4,382,116 A | | 5/1983 | Gahn et al. | |
| 4,786,567 A | | 11/1988 | Skyllas-Kazacos et al. | |
| 4,816,358 A | | 3/1989 | Holleck et al. | |
| RE32,920 E | | 5/1989 | Matson et al. | |
| 4,882,241 A | | 11/1989 | Heinzel et al. | |
| 4,938,851 A | | 7/1990 | Nidola | |
| 4,956,244 A | | 9/1990 | Shimizu et al. | |
| 4,973,561 A | | 11/1990 | Hansen et al. | |
| 5,167,820 A | | 12/1992 | Clough et al. | |
| 5,250,158 A | | 10/1993 | Kaneko et al. | |
| 5,318,865 A | | 6/1994 | Kaneko et al. | |
| 5,368,762 A | | 11/1994 | Sato et al. | |
| 5,547,777 A | * | 8/1996 | Richards ........................ | 429/437 |
| 5,587,132 A | | 12/1996 | Nakajima et al. | |
| 5,656,390 A | | 8/1997 | Kageyama et al. | |
| 5,759,711 A | | 6/1998 | Miyabayashi et al. | |
| 5,804,329 A | | 9/1998 | Amendola | |
| 5,851,694 A | | 12/1998 | Miyabayashi et al. | |
| 6,040,075 A | | 3/2000 | Adcock et al. | |

(Continued)

OTHER PUBLICATIONS

PCT International Search Report and Written Opinion mailed May 21, 2012, in related International Application No. PCT/US2012/021298.

(Continued)

*Primary Examiner* — Jonathan Jelsma
(74) *Attorney, Agent, or Firm* — Haynes and Boone, LLP

(57) ABSTRACT

A stacked cell for a flow cell battery is presented. The stacked cell is sealed by a gasket between individual components. The gasket is formed such that it seals against leakage of electrolytes and facilitates the flow of electrolytes through the stacked cell. Further, the gasket is formed to minimize the linear expansion of the gasket material with temperature.

14 Claims, 14 Drawing Sheets

(56) References Cited

U.S. PATENT DOCUMENTS 6,143,443 A 11/2000 Kazacos et al.
6,338,787 B1 1/2002 Obata et al.
6,461,772 B1 10/2002 Miyake et al.
6,468,688 B2 10/2002 Kazacos et al.
6,475,661 B1 11/2002 Pellegri et al.
6,475,668 B1 11/2002 Hosokawa et al.
6,497,973 B1 12/2002 Amendola et al.
6,509,119 B1 1/2003 Kobayashi et al.
6,555,267 B1 4/2003 Broman et al.
6,558,840 B1 5/2003 Hikmet
6,562,514 B1 5/2003 Kazacos et al.
6,613,298 B2 9/2003 Tanaka et al.
6,652,819 B2 11/2003 Shiroto et al.
6,656,639 B1 12/2003 Hagg et al.
6,692,862 B1 2/2004 Zocchi
6,761,945 B1 7/2004 Adachi et al.
6,764,663 B2 7/2004 Monaghan et al.
6,764,789 B1 7/2004 Sekiguchi et al.
6,872,376 B2 3/2005 Tanaka et al.
6,905,797 B2 6/2005 Broman et al.
6,986,966 B2 1/2006 Clarke et al.
7,061,205 B2 6/2006 Shigematsu et al.
7,078,123 B2 7/2006 Kazacos et al.
7,181,183 B1 2/2007 Hennessy
7,199,550 B2 4/2007 Tsutsui et al.
7,220,515 B2 5/2007 Ito et al.
7,227,275 B2 6/2007 Hennessy et al.
7,252,898 B2 8/2007 Markoski et al.
7,258,947 B2 8/2007 Kubata et al.
7,265,456 B2 9/2007 Hennessy
7,270,911 B2 9/2007 Clarke et al.
7,309,540 B2 12/2007 Wang
7,320,844 B2 1/2008 Skyllas-Kazacos
7,353,083 B2 4/2008 Hennessy
7,517,608 B2 4/2009 Brereton et al.
7,537,859 B2 5/2009 Samuel et al.
7,557,531 B2 7/2009 Willets et al.
7,572,553 B2 8/2009 Ohkubo et al.
7,670,719 B2 3/2010 Nakaishi et al.
7,682,728 B2 3/2010 Harper
7,687,193 B2 3/2010 Harper
7,704,634 B2 4/2010 Deguchi et al.
7,740,977 B2 6/2010 Lepp et al.
7,820,321 B2 10/2010 Horne et al.
7,824,806 B2 11/2010 Visco et al.
7,855,005 B2 12/2010 Sahu
7,871,740 B2 1/2011 Tamura et al.
7,919,204 B2 4/2011 Sahu
7,923,965 B2 4/2011 Ritter et al.
7,927,731 B2 4/2011 Sahu
7,976,974 B2 7/2011 Kazacos et al.
2001/0028977 A1 10/2001 Kazacos et al.
2002/0048546 A1 4/2002 Tanaka et al.
2002/0112968 A1 8/2002 Shiroto et al.
2002/0119090 A1 8/2002 Tanaka et al.
2003/0017102 A1 1/2003 Monaghan et al.
2003/0087156 A1 5/2003 Broman et al.
2003/0091885 A1* 5/2003 Kobayashi et al. ............. 429/32
2003/0143456 A1 7/2003 Kazacos et al.
2004/0121204 A1 6/2004 Adelman et al.
2004/0151957 A1 8/2004 Brooks et al.
2004/0169493 A1 9/2004 Tsutsui et al.
2004/0170893 A1 9/2004 Nakaishi et al.
2004/0191623 A1 9/2004 Kubata et al.
2004/0202915 A1 10/2004 Nakaishi et al.
2004/0234843 A1 11/2004 Skyllas-Kazacos
2004/0241544 A1 12/2004 Nakaishi et al.
2004/0241552 A1 12/2004 Skyllas-Kazacos
2005/0074653 A1 4/2005 Broman et al.
2005/0074665 A1 4/2005 Spaziante et al.
2005/0156431 A1 7/2005 Hennessy
2005/0156432 A1 7/2005 Hennessy
2005/0158614 A1 7/2005 Hennessy
2005/0158615 A1 7/2005 Samuel et al.
2005/0164075 A1 7/2005 Kumamoto et al.
2005/0181273 A1 8/2005 Deguchi et al.
2005/0244707 A1 11/2005 Skyllas-Kazacos et al.
2005/0287436 A1 12/2005 Kawashige et al.
2006/0063065 A1 3/2006 Clarke et al.
2006/0110648 A1 5/2006 Lee et al.
2006/0171086 A1 8/2006 Hennessy et al.
2006/0183016 A1 8/2006 Kazacos et al.
2006/0188784 A1 8/2006 Sudoh et al.
2007/0042254 A1 2/2007 Wozniczka et al.
2007/0072034 A1 3/2007 Barker et al.
2007/0072067 A1 3/2007 Symons et al.
2007/0111101 A1 5/2007 Ohkubo et al.
2007/0138872 A1 6/2007 Willets et al.
2007/0264557 A1 11/2007 Kobayashi et al.
2008/0026282 A1 1/2008 Tamura et al.
2008/0081247 A1 4/2008 Nakaishi et al.
2008/0193828 A1 8/2008 Sahu
2008/0220318 A1 9/2008 Brereton et al.
2008/0220335 A1 9/2008 Casteel
2008/0241643 A1 10/2008 Lepp et al.
2008/0248339 A1 10/2008 Soloveichik et al.
2008/0248345 A1 10/2008 Soloveichik et al.
2008/0292964 A1 11/2008 Kazacos et al.
2009/0017379 A1 1/2009 Inatomi et al.
2009/0047570 A1 2/2009 Harper
2009/0047571 A1 2/2009 Harper
2009/0092882 A1 4/2009 Kjeang et al.
2009/0134717 A1 5/2009 Marks
2009/0169941 A1 7/2009 Spink et al.
2009/0197151 A1 8/2009 Kumamoto et al.
2009/0218984 A1 9/2009 Parakulam
2009/0305104 A1 12/2009 Matsumoto et al.
2010/0003545 A1 1/2010 Horne et al.
2010/0003586 A1 1/2010 Sahu
2010/0047671 A1 2/2010 Chiang et al.
2010/0055513 A1 3/2010 Soloveichik
2010/0081029 A1 4/2010 Fukuta et al.
2010/0089480 A1 4/2010 Sahu et al.
2010/0090651 A1 4/2010 Sahu et al.
2010/0092757 A1 4/2010 Nair et al.
2010/0092807 A1 4/2010 Sahu et al.
2010/0092843 A1 4/2010 Conway
2010/0094468 A1 4/2010 Sahu et al.
2010/0136455 A1 6/2010 Winter
2010/0137143 A1 6/2010 Rothberg et al.
2010/0143781 A1 6/2010 Keshavarz et al.
2010/0173217 A1 7/2010 Brandner et al.
2010/0178533 A1 7/2010 Whitehead et al.
2010/0216006 A1 8/2010 Rennebeck
2010/0261070 A1 10/2010 Keshavarz et al.
2010/0291420 A1 11/2010 Kazacos et al.
2010/0291470 A1 11/2010 Sadasue et al.
2010/0301398 A1 12/2010 Rothberg et al.
2011/0001436 A1 1/2011 Chemel et al.
2011/0001438 A1 1/2011 Chemel et al.
2011/0003232 A1 1/2011 Obika
2011/0014527 A1 1/2011 Ohlsen
2011/0045332 A1 2/2011 Horne et al.
2011/0048800 A1 3/2011 Green
2011/0070483 A1 3/2011 Keshavarz et al.
2011/0074357 A1 3/2011 Parakulam et al.
2011/0076526 A1 3/2011 Zu et al.
2011/0079074 A1 4/2011 Sahu
2011/0080143 A1 4/2011 Parakulam et al.
2011/0081561 A1 4/2011 Keshavarz et al.
2011/0081562 A1 4/2011 Parakulam et al.
2011/0086247 A1 4/2011 Keshavarz et al.
2011/0117411 A1 5/2011 Horne et al.
2011/0189520 A1 8/2011 Carter et al.
2011/0189549 A1 8/2011 Sun et al.

OTHER PUBLICATIONS

International Preliminary Report on Patentability and the Written Opinion mailed Jul. 25, 2013, in related International Application No. PCT/US2012/021298.
India Patent App. No. 0519/CHE/2008 filed Feb. 29, 2008 (42 pages).
India Patent App. No. 716-DEL-2010 filed Mar. 25, 2010 (30 pages).
India Patent App. No. 2198-DEL-2006 filed Oct. 5, 2006 (13 pages).

(56) References Cited

OTHER PUBLICATIONS

India Patent App. No. 3347-DELNP-2007 filed May 4, 2007 (36 pages).
India Patent App. No. 4282-DELNP-2007 filed Jun. 5, 2007 (27 pages).
India Patent App. No. 4285/DELNP/2007 filed Jun. 5, 2007 (20 pages).
India Patent App. No. 5885-DELNP-2008 filed Jul. 7, 2008 (26 pages).
India Patent Publication for App. No. 5952/DELNP/2008 published on Oct. 24, 2008 (26 pages).
India Patent Publication for IN/PCT/2001/00995/DEL filed on Oct. 29, 2001 (26 pages).
Patent Pub. No. WO 2008/116248, PCT App. No. PCT/AU2008/000353 (26 pages).
Patent Pub. No. WO 2010/5954, PCT App. No. PCT/US2009/0049789 (79 pages).
India App. No. 109/KOLNP/2011 filed Jan. 10, 2011, "Redox Flow Battery System for Distributed Energy Storage", by Enervault Corporation (106 pages).
India App. No. 3074/KOLNP/2009, filed Aug. 31, 2009, "Cell Stack for a Flowing Electrolyte Battery", by Redflow Pty Ltd. (22 pages).
India Patent 217865, from IN/PCT/2001/00995/DEL, filed Oct. 29, 2001, "A Redox Flow Battery Plant and a Method of Operaing a Redox Flow Battery", by Squirrel Holdings Ltd. (30 pages).
India Patent 197485 as Granted, from 73/DEL/1999, filed Jan. 12, 1999, "A Method of Operating a Redox Flow Battery System and a Cell Stack", by Squirrel Holdings Ltd. (43 pages).
Application No. 1588/CHE/2008, filed Jun. 30, 2008, "Storage Battery," by Furukawa Battery Co., Ltd. (37 pages).
Application No. 3626/CHENP/2010, filed Jun. 15, 2010, "Redox Flow Cell," by Deeya Energy, Inc. (31 pages).
Application No. 3627/CHENP/2010, filed Jun. 15, 2010, "Thermal Control of a Flow Cell Battery," by Deeya Energy, Inc. (28 pages).
Application No. 3628/CHENP/2010, filed Jun. 15, 2010, "Method and Apparatus for Determining State of Charge of a Battery," by Deeya Energy, Inc. (32 pages).
Application No. 3629/CHENP/2010, filed Jun. 15, 2010, "Methods for the Preparation and Purification of Electrolytes for Redox Flow Batteries," by Deeya Energy, Inc. (30 pages).
Application No. 3633/CHENP/2010, filed Jun. 15, 2010, "Level Sensor for Conductive Liquids," by Deeya Energy, Inc. (27 pages).
Application No. 3634/CHENP/2010, filed Jun. 15, 2010, "Flexible Multi-Walled Tubing Assembly," by Deeya Energy, Inc. (32 pages).
Application No. 3635/CHENP/2010, filed Jun. 15, 2010, "Battery Charger," by Deeya Energy, Inc. (33 pages).
Application No. 4643/CHENP/2009, filed Aug. 7, 2009, "Apparatus and Methods of Determination of State of Charge in a Redox Flow Battery," by Deeya Energy, Inc. (49 pages).

* cited by examiner

FLOW CELL STACK

REFERENCE TO RELATED APPLICATIONS

The present invention claims priority to U.S. Provisional Application No. 61/432,541, entitled "Flow Cell Stack", filed on Jan. 13, 2011, the contents of which are herein incorporated by reference in its entirety.

BACKGROUND

1. Technical Field

The present invention is related to a Flow Cell Stack.

2. Discussion of Related Art

Reduction-oxidation (redox) flow batteries store electrical energy in a chemical form, and subsequently dispense the stored energy in an electrical form via a spontaneous reverse redox reaction. A redox flow battery is an electrochemical storage device in which an electrolyte containing one or more dissolved electro-active species flows through a reactor cell where chemical energy is converted to electrical energy. Conversely, the discharged electrolyte can be flowed through a reactor cell such that electrical energy is converted to chemical energy. Electrolyte is stored externally, for example in tanks, and flowed through a set of cells where the electrochemical reaction takes place. Externally stored electrolytes can be flowed through the battery system by pumping, gravity feed, or by any other method of moving fluid through the system. The reaction in a flow battery is reversible; the electrolyte can be recharged without replacing the electroactive material. The energy capacity of a redox flow battery, therefore, is related to the total electrolyte volume (i.e., the size of the storage tank). The discharge time of a redox flow battery at full power also depends on electrolyte volume and can vary from several minutes to many days.

The minimal unit that performs the electrochemical energy conversion is generally called a "cell," whether in the case of flow batteries, fuel cells, or secondary batteries. A device that integrates many such cells, coupled electrically in series and/or parallel to get higher current, voltage, or both, is generally called a "battery." However, it is common to refer to any collection of coupled cells, including a single cell used on its own, as a battery stack. As such, a single cell can be referred to interchangeably as a "cell" or a "battery."

Redox flow batteries can be utilized in many technologies that require the storage of electrical energy. For example, redox flow batteries can be utilized to store night-time electricity that is inexpensive to produce, and to subsequently provide electricity during peak demand when electricity is more expensive to produce or demand is beyond the capability of current production. Such batteries can also be utilized for storage of green energy (i.e., energy generated from renewable sources such as wind, solar, wave, or other non-conventional sources). Flow redox batteries can be utilized as uninterruptible power supplies in place of more expensive backup generators. Efficient methods of power storage can be used to construct devices having a built-in backup that mitigates the effects of power cuts or sudden power failures. Power storage devices can also reduce the impact of a failure in a generating station.

Construction of a flow battery stack, whether it be a single cell or a stack of cells, has been problematic. Leakage of electrolytes from the cell can cause damage to surrounding components. Further, leakage of one electrolyte into another causes a drain of charge on the battery and may further cause heating or other stresses to occur with the stack.

Therefore, there is a need for better production of cells and battery stack within a flow cell battery.

SUMMARY

In accordance with some aspects of the present invention, a stacked cell includes a first electrode component; a second electrode component; and a membrane component positioned between the first electrode component and the second electrode component and separated from the first electrode component with a first gasket and separated from the second electrode component by a second gasket, wherein the first gasket allows flow of a first electrolyte between the first electrode component and the membrane and the second gasket allows flow of a second electrolyte between the membrane and the second electrode component.

In accordance with some embodiments of the present invention, a method of forming a stacked cell includes providing a first end electrode; positioning a first gasket over the first end electrode; positioning a membrane component over the first gasket; positioning a second gasket over the membrane component; positioning a second electrode over the first gasket; building of a stack of such cells electrically in series, but fluidically in parallel, applying compression to the stacked cell; annealing the stacked cell; and tensioning the stacked cell.

These and other embodiments of the invention are further described below with respect to the following figures.

In the figures, elements having the same designation have the same or similar functions. The figures are illustrative only and relative sizes and distances depicted in the figures are for convenience of illustration only and have no further meaning.

DETAILED DESCRIPTION

In the following description, for the purposes of explanation, specific details are set forth in order to provide a thorough understanding of some e embodiments of the invention. However, it will be apparent that the invention may be practiced without these specific details.

As used in the present specification, the following words and phrases are generally intended to have the meanings as set forth below, except to the extent that the context in which they are used indicates otherwise.

As described herein, the teen "cell" refers generally to any unit capable of performing electrochemical energy conversion. Exemplary cells include, but are not limited to, redox flow batteries, fuel cells, and secondary batteries.

As described herein, the term "membrane" refers to any material that forms a barrier between fluids, for example between electrochemical half-cells (e.g., an anode compartment and a cathode compartment). Exemplary membranes may be selectively permeable, and may include porous membranes and ion-selective membranes. Exemplary membranes may include one or more layers, wherein each layer exhibits a selective permeability for certain species (e.g., ions), and/or affects the passage of certain species.

As described herein, the term "fluid communication" refers to structures which are in contact with, but not necessarily affixed to, one another, whereby a fluid or gas can pass from one structure to the other. For example, two structures may be in fluid communication with one another by a channel, conduit, opening, and/or valve, even if the communication includes a valve in a closed state but provided that the valve may be opened, whereby a fluid or gas may be moved from one of the structures to the other. In addition, two structures may be considered to be in fluid communication with each other even in circumstances where one or more intermediate structures divert and/or interrupt the flow of the fluid or gas from the first structure to the second structure, so long as flow of the fluid or gas from the one or more intermediate structures to the second structure is ultimately possible.

As described herein, "stack" refers to a stack of electrochemical cells connected together electrically and fluidically.

Figure 1:
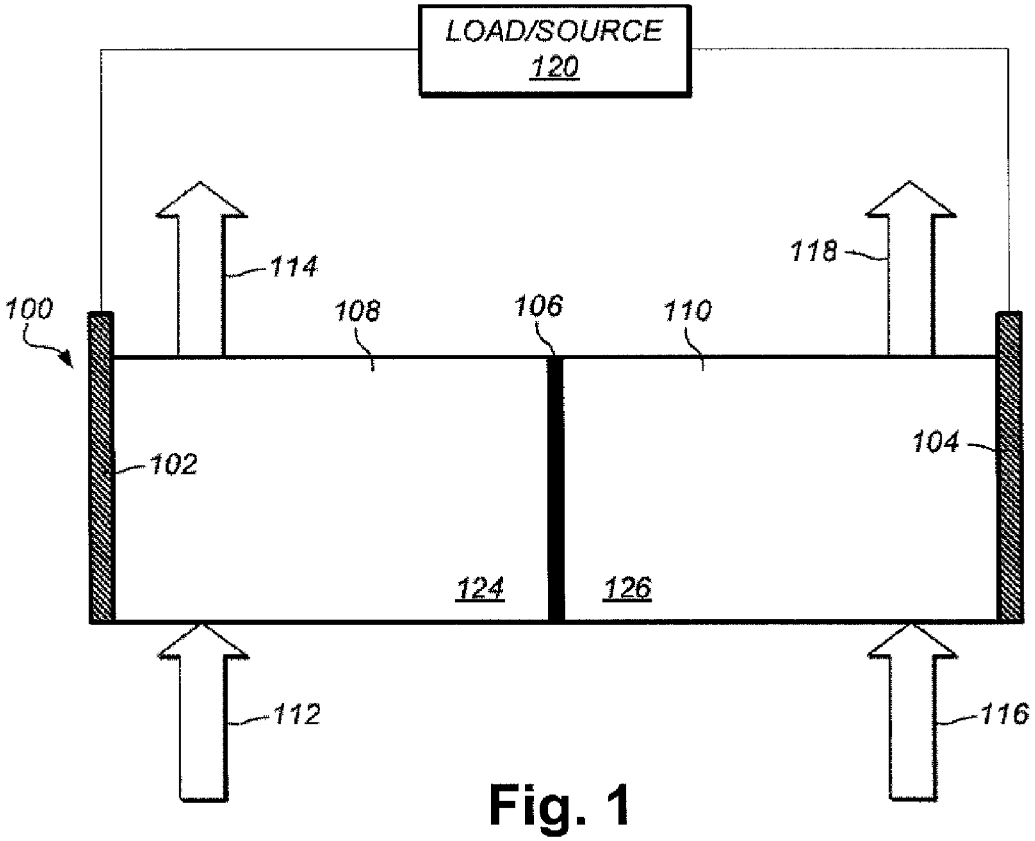
FIG. 1 illustrates a reduction-oxidation (redox) cell according to some embodiments of the present invention.

FIG. 1 illustrates a schematic drawing of a simplified redox flow cell battery system 100, with a single electro chemical cell. As shown, redox flow cell system includes redox flow cell 100, which includes two half-cells 108 and 110 separated by a membrane 106. An electrolyte 124 is flowed through half-cell 108 and an electrolyte 126 is flowed through half-cell 110. Half-cells 108 and 110 include electrodes 102 and 104, respectively, in contact with electrolytes 124 and 126, respectively, such that redox reactions occur at the surface of the electrodes 102 or 104. In some embodiments, multiple redox flow cells 100 may be electrically coupled (e.g., stacked) either in series to achieve higher voltage or in parallel in order to achieve higher current. The stacked cells are collectively referred to as a battery stack and flow cell battery can refer to a single cell or battery stack. As shown in FIG. 1, electrodes 102 and 104 are coupled across load/source 120, through which electrolytes 124 and 126 are either charged or discharged.

When filled with electrolyte, half-cell 110 of redox flow cell 100 contains anolyte 126 and the other half-cell 108 contains catholyte 124, the anolyte and catholyte being collectively referred to as electrolytes. Cell 100 may be in fluid communications with tanks of electrolyte. As such, reactant electrolytes may be stored in separate reservoirs and dispensed into half-cells 108 and 110 via conduits coupled to cell inlet/outlet (I/O) ports 112, 114 and 116, 118 respectively. In some embodiments, an external pumping system is used to transport the electrolytes to and from the redox flow cell. Electrolyte 124 flows into half-cell 108 through inlet port 112 and out through outlet port 114, while electrolyte 126 flows into half-cell 110 through inlet port 116 and out of half-cell 110 through outlet port 118.

At least one electrode 102 and 104 in each half-cell 108 and 110 provides a surface on which the redox reaction takes place and from which charge is transferred. Suitable materials for preparing electrodes 102 and 104 generally include those known to persons of ordinary skill in the art. Redox flow cell 100 operates by changing the oxidation state of its constituents during charging or discharging. The two half-cells 108 and 110 are connected in series by the conductive electrolytes, one for anodic reaction and the other for cathodic reaction. In operation (e.g., during charge or discharge), electrolytes 126 and 124 are flowed through half-cells 108 and 110 through I/O ports 112, 114 and 116, 118 respectively as the redox reaction takes place.

Positive ions or negative ions pass through permeable membrane 106, which separates the two half-cells 108 and 110, as the redox flow cell 100 charges or discharges. Reactant electrolytes are flowed through half-cells 108 and 110, as necessary, in a controlled manner to supply electrical power or be charged by load/source 120. Suitable membrane materials for membrane 106 include, but are not limited to, materials that absorb moisture and expand when placed in an aqueous environment. In some embodiments, membrane 106 may comprise sheets of woven or non-woven plastic with active ion exchange materials such as resins or functionalities embedded either in a heterogeneous (such as co-extrusion) or homogeneous (such as radiation grafting) way. In some embodiments, membrane 106 may be a porous membrane having high voltaic efficiency Ev and high coulombic efficiency and may be designed to limit mass transfer through the membrane to a minimum while still facilitating ionic transfer. In some embodiments, membrane 106 may be made from a polyolefin material and may have a specified thickness and pore diameter. A manufacturer having the capability to manufacture these membranes, and other membranes consistent with embodiments disclosed, is Daramic Microporous Products, L.P., N. Community House Rd., Suite 35, Charlotte, N.C. 28277. In certain embodiments, membrane 106 may be a nonselective microporous plastic separator also manufactured by Daramic Microporous Products L.P. A flow cell formed from such a membrane is disclosed in U.S. Published Patent App. No. 2010/0003586, filed on Jul. 1, 2008, which is incorporated herein by reference in its entirety.

In some embodiments, multiple redox flow cells may be stacked to form a redox flow cell battery system. Construction of a flow cell stack battery system is described in U.S. patent application Ser. No. 12/577,134, entitled "Common Module Stack Component Design" filed on Oct. 9, 2009, which is incorporated herein by reference.

In some embodiments of redox flow cell 100 in FIG. 1, electrolyte 124 includes an aqueous acid solution. In some embodiments, the acidic solution includes aqueous hydrochloric acid. Electrolyte 124 further includes at least one metal salt (e.g., a metal chloride salt). In some embodiments, electrolyte 126 comprises an aqueous acid solution. In some embodiments, the acidic solution includes aqueous hydrochloric acid. Electrolyte 126 further includes at least one metal salt (e.g., a metal chloride salt).

In some embodiments, a redox flow cell battery system is based on a Cr/Fe redox pair. The remainder of the description will be based on a Cr/Fe redox flow cell battery, however, it should be understood that the concepts described herein may also be applied to other metals. In an embodiment of a Cr/Fe redox flow cell battery, both electrolytes 124 and 126 include a solution of $FeCl_2$ and $CrCl_3$ in aqueous HCl.

Descriptions of various details of redox flow cell battery systems can be found in the following U.S. Patent Applications, all of which are incorporated herein by reference in their entirety: U.S. patent application Ser. No. 11/674,101, entitled "Apparatus and Methods of Determination of State of Charge in a Redox Flow Battery", filed on Feb. 12, 2007; U.S. application Ser. No. 12/074,110, entitled "Battery Charger", filed on Feb. 28, 2008; U.S. patent application Ser. No. 12/217,059, entitled "Redox Flow Cell," filed on Jul. 1, 2008; U.S. patent application Ser. No. 12/576,235, entitled "Magnetic Current Collector" filed on Oct. 8, 2009; U.S. patent application Ser. No. 12/576,240, entitled "Venturi Pumping System in a Hydrogen Gas Circulation of a Flow Battery" filed on Oct. 8, 2009; U.S. patent application Ser. No. 12/576,242, entitled "Method and Apparatus for Determining State of Charge of a Battery" filed on Oct. 9, 2009; U.S. patent application Ser. No. 12/577,124, entitled "Flexible Multi-Walled Tubing Assembly" filed on Oct. 9, 2009; U.S. patent application Ser. No. 12/577,127, entitled "Thermal Control of a Flow Cell Battery" filed on Oct. 9, 2009; U.S. patent application Ser. No. 12/577,131, entitled "Methods for Bonding Porous Flexible Membranes Using Solvent" filed on Oct. 9, 2009; U.S. patent application Ser. No. 12/577,134, entitled "Common Module Stack Component Design" filed on Oct. 9, 2009; U.S. patent application Ser. No. 12/577,147, entitled "Level Sensor for Conductive Liquids" filed on Oct. 9, 2009; U.S. patent application Ser. No. 12/631,749, entitled "Methods for the Preparation and Purification of Electrolytes for Redox Flow Batteries" filed on Dec. 4, 2009; U.S. patent application Ser. No. 12/721,411, entitled "Methods for the Preparation of Electrolytes for Chromium-Iron Redox Flow Batteries" filed on Mar. 10, 2010; U.S. patent application Ser. No. 12/790,793 entitled "Control System for a Flow Cell Battery", filed May 28, 2010; U.S. patent application Ser. No. 12/790,595 entitled "Preparation of Redox Flow Battery Electrolytes from Raw Materials", filed May 28, 2010; U.S. patent application Ser. No. 12/790,601 entitled "Electrolyte Compositions", filed May 28, 2010; U.S. patent application Ser. No. 12/790,794 entitled "Hydrogen Chlorine Level Detector", filed May 28, 2010; U.S. patent application Ser. No. 12/790,749 entitled "Optical Leak Detection Sensor", filed May 28, 2010; U.S. patent application Ser. No. 12/790,783 entitled "Buck-Boost Control Circuit", filed May 28, 2010; U.S. patent application Ser. No. 12/790,573 entitled "Flow Cell Rebalancing", filed May 28, 2010; and U.S. patent application Ser. No. 12/790,613 entitled "Methods of Producing Hydrochloric Acid from Hydrogen Gas and Chlorine Gas", filed May 28, 2010.

Figure 2:
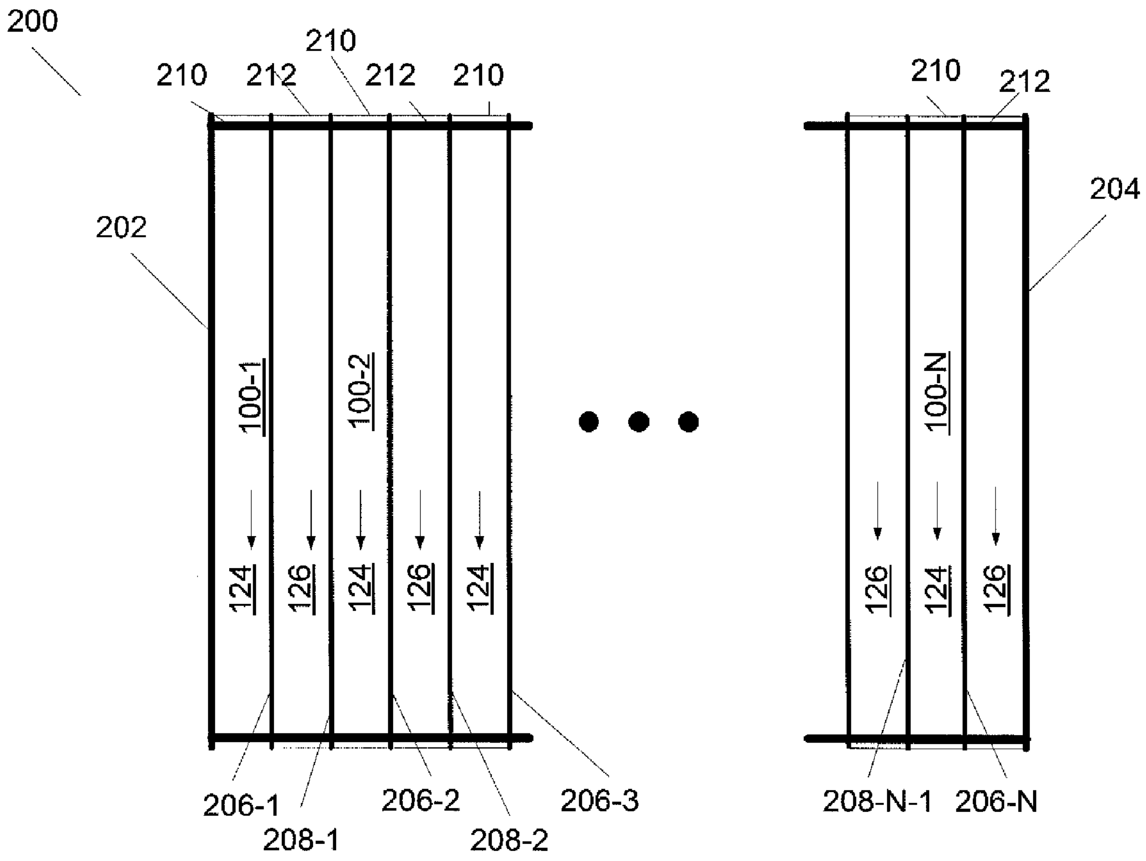
FIG. 2 illustrates a stacked cell according to some embodiments of the present invention.

FIG. 2 illustrates a stacked cell 200 according to some embodiments of the present invention. FIG. 1 illustrates a cell 100 with one cell having sections 108 and 110. Stacked cell 200 includes N cells, designated as cells 100-1 through 100-N. As shown in FIG. 1, each cell 100 (one of cells 100-1 through 100-N) is bound by electrodes (electrodes 100 and 104 are shown in FIG. 1) with the cell itself divided by a membrane (membrane 106 is shown in FIG. 1).

As shown in FIG. 2, a first end electrode 202 forms one side of cell 100-1 while a second end electrode 204 forms a side of cell 100-N. Electrodes 202 and 204 form the cathode and anode sides of the operating flow cell battery and are further discussed in U.S. application Ser. No. 12/576,235, entitled "Magnetic Current Collector," filed on Oct. 8, 2009. As such, a load may be coupled across electrodes 202 and 204 and electrolytes 124 and 126 can be charged by applying current to electrodes 202 and 204.

Membranes in FIG. 2 are designated as 206-1 through 206-N while internal electrodes are designated as 208-1 through 208-(N−1). Therefore, cell 100-1 is bound by electrode 202 and 208-1 with the two halves of cell 100-1 separated by membrane 206-1. Cell 100-2 is bound by electrode 208-1 and 208-2 and the two half cells separated by membrane 206-2. Cell 100-N is bound by electrodes 208-(N−1) and 204 and the two half cells separated by membrane 206-N.

As further shown in FIG. 2, each of the components is separated by a gasket 210 or a gasket 212. For example, electrode 202 and membrane 206-1 are separated by a gasket 210 while membrane 206-1 is separated from internal electrode 208-1 by a gasket 212. In some embodiments of the invention, gasket 210 and gasket 212 differ only by their orientation in stacked cell 200.

In some embodiments, electrodes 124 and 126 flow through stacked cell 200 in their appropriate half-cells. Although the particular example shown in FIG. 2 illustrates flows of electrodes 124 and 126 in the same direction, in some embodiments they may be in opposite directions.

The challenges of producing a stack 200 includes allowing for the flow of electrolytes 124 and 126 through stack 200 without also leaking electrolytes 124 and 126 out of stack 200 or mixing electrolytes 124 and 126 in stack 200. In some embodiments, gaskets 210 and 212 prevent leaking of electrolytes 124 and 126 from stack 200, mixing of electrolytes 124 and 126, and facilities the flow of electrolytes 124 and 126 through stack 200.

Figure 3:
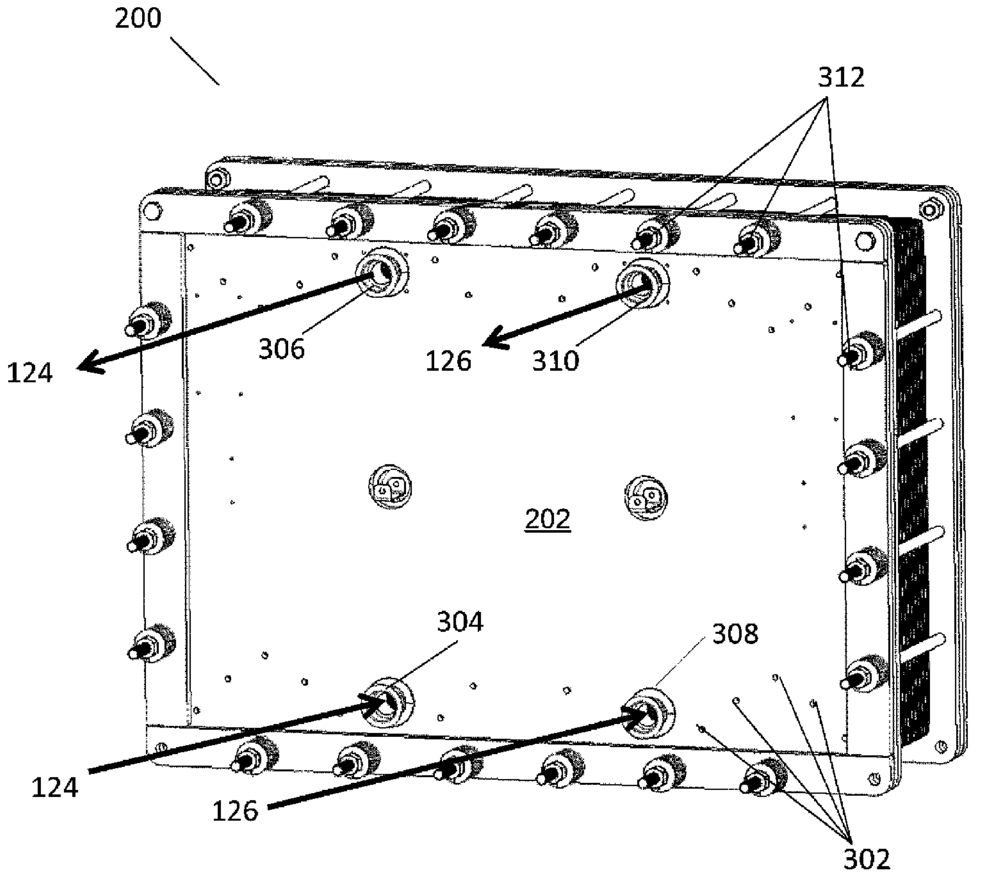
FIG. 3 illustrates the stacked cell shown in FIG. 2, rotated to illustrate electrolyte manifolds and compression mounting according to some embodiments of the present invention.

FIG. 3 illustrates stack 200 rotated to observe end electrode 202. As shown in FIG. 3, electrolyte 124 is flowed into a manifold access 304 and out of manifold access 306. Similarly, electrolyte 126 is flowed into a manifold access 308 and out of manifold access 310. Electrolyte 124 and 126 can be coupled into and out of stack 200 utilizing appropriate plumbing such that manifold accesses 304 and 306 are in fluid communication with a reservoir of electrolyte 124 and manifold accesses 308 and 310 are in fluid communications with a reservoir of electrolyte 126.

FIG. 3 illustrates an example where manifold accesses 304, 306, 308, and 310 are all on one end electrode 202. In this example, there may be no manifold accesses on electrode 204 (so that electrolyte flows in and out of electrode 202). However, in some embodiments, manifolds may be arranged on both electrodes 202 and 204. In any event, manifolds are arranged such that electrolytes 124 and 126 are appropriately flowed through stacked cell 200.

FIG. 3 also illustrates threaded rods 312 and alignment rods 302. Threaded rods 312 operate to hold stack 200 together and apply appropriate pressure on gaskets 210 and 212 to prevent leaking and mixing of electrolytes. Alignment rods 302 can also be utilized during construction of stack 200 to align each of the components of stacked cell 200. The alignment rods 302 may be replaced with a sealant upon completion of the stack assembly. As illustrated in FIG. 3, rods 302 can be distributed in order to best hold a constant pressure on stack 200 as well as to provide for positioning of the components of stack 200.

Figure 4A:
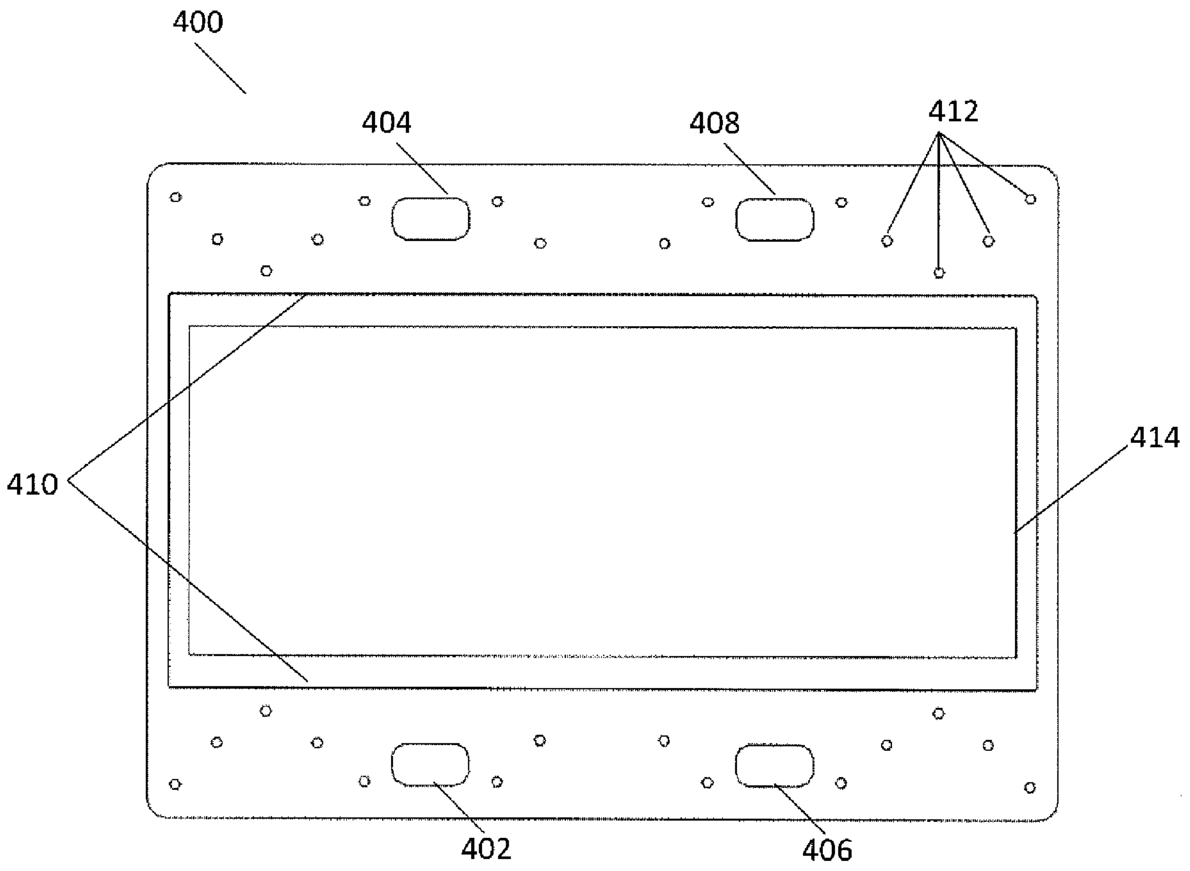
FIGS. 4A and 4B illustrate components that can be utilized in the stacked cell as illustrated in FIG. 2.

FIG. 4A illustrates a component 400 of stack 200. Component 400 includes an opening 410 to which an internal electrode material of substantially the same thickness can be mounted. Appropriate electrode materials have been discussed, for example, in U.S. patent application Ser. No. 12/217,059, entitled "Redox Flow Cell," filed on Jul. 1, 2008 and U.S. patent application Ser. No. 12/577,134, entitled "Common Module Stack Component Design" filed on Oct. 9, 2009.

Figure 4B:
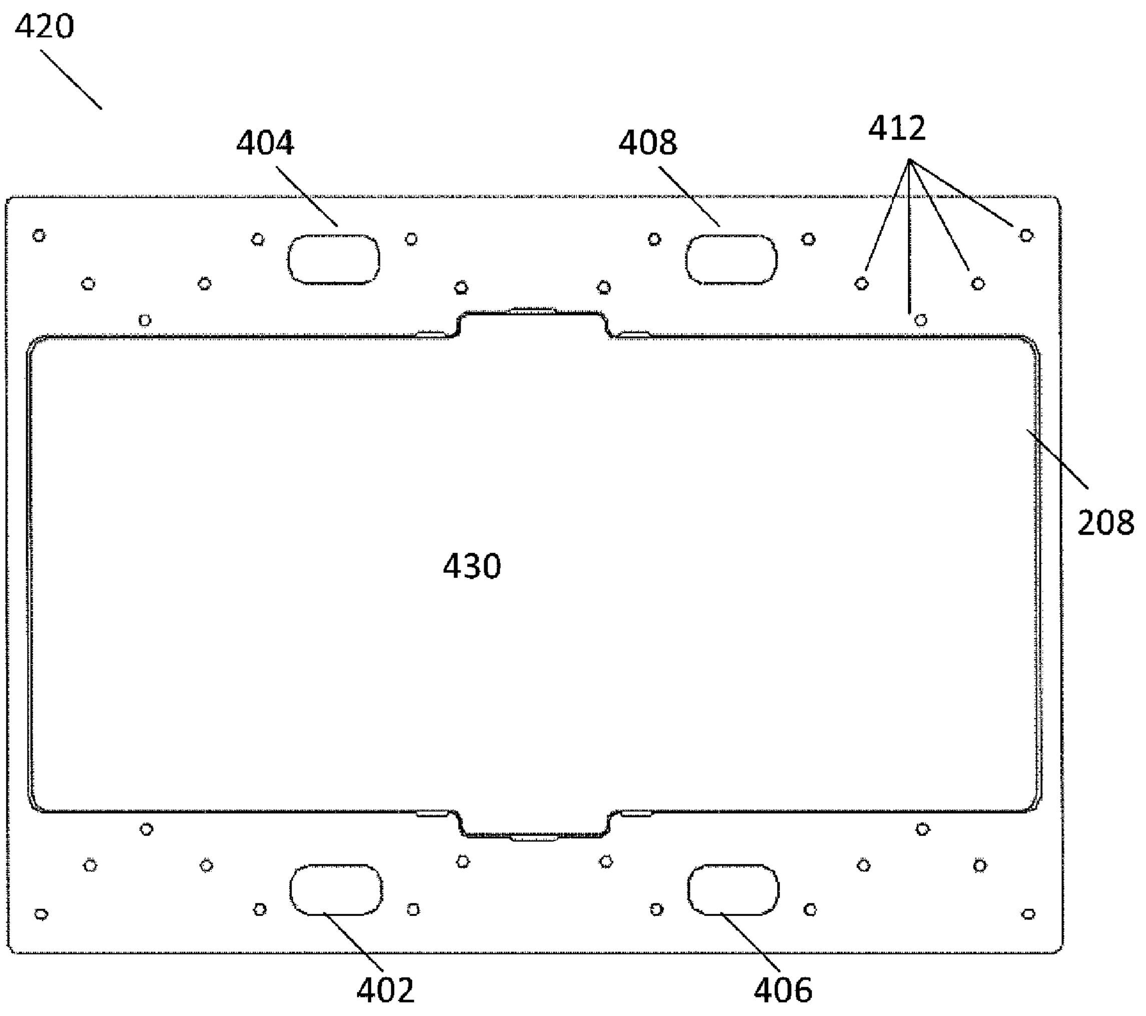

FIG. 4B illustrates a component 420 of stack 200. Component 420 includes an opening 430 to which an internal membrane material of substantially the same thickness can be mounted. Appropriate membrane materials have been discussed, for example, in U.S. patent application Ser. No. 12/217,059, entitled "Redox Flow Cell," filed on Jul. 1, 2008 and U.S. patent application Ser. No. 12/577,134, entitled "Common Module Stack Component Design" filed on Oct. 9, 2009.

The electrode material, which is rigidly attached to component 400, can be, for example, a conducting polymer or plastic material, such as a carbon infused plastic or graphite material. Similarly, membrane 206 can be a porous membrane, which is rigidly attached to component 420 at area 430, by using hot melt glue having appropriate chemical compatibility with the electrolyte. Examples of bonding membranes are described in U.S. patent application Ser. No. 12/577,131, entitled "Methods for Bonding Porous Flexible Membranes Using Solvent" filed on Oct. 9, 2009.

Components 400 and 420 themselves are stamped from extruded plastic sheets. Although component 400 and 420 can be of any dimensions. In some embodiments, for example, component 400 is 32.5"×23.5"×0.023" and component 420 is 32.5"×23.5"×0.036". Components 400 and 420 have smooth, flat surfaces on both sides that all for placement of gaskets 210 and 212 and facilitate sealing with gaskets 210 and 212. As shown in FIG. 4, access 402, 404, 406, and 408 allow for the passage of electrolytes 124 and 126 through stacked cell 200. In stacked cell 200, access 402, 404, 406, and 408 are positioned to form manifolds to facilitate the flow of electrolytes 124 and 126 through stack 200. Manifold access 304 and 306 for the passage of electrolyte 124 into a manifold formed by accesses 402 and 404, respectively, while manifold accesses 308 and 310 allow passage of electrolyte 126 into a manifold formed by accesses 406 and 408. Holes 412 allow for the access of rods 302. During construction, component 400 can be positioned on stack 200 by placing component 400 with internal electrode 208 with graphite felt 414 attached on both sides such that rods 302 pass through holes 412. Similarly, component 420 can be positioned on stack 200 by placing component 420 with membrane 206, such that rods 302 pass through holes 412. For convenience, not all of holes 412 are shown. However, holes 412 align with alignment rods 302 as shown in FIG. 3.

Figure 5A:
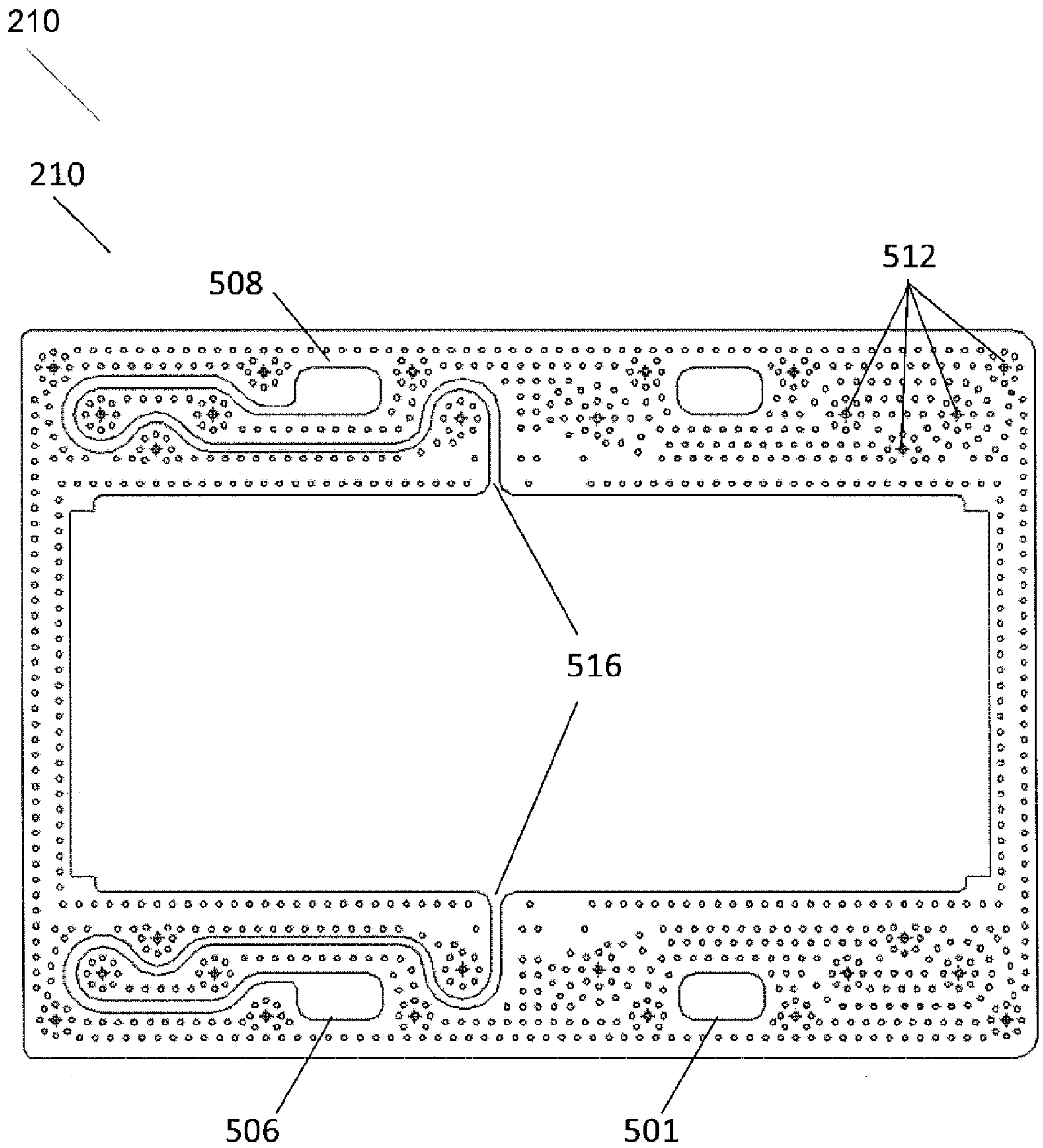
FIG. 5A illustrates a gasket that can be utilized in the stacked cell shown in FIG. 2.

FIG. 5A illustrates an example of gasket 210. Gasket 212 shown in FIG. 2 is gasket 210 rotated by 180 degrees about an axis perpendicular to the plane of gasket 210. As with component 400, gasket 210 includes access holes 512 through which rods 302 can be passed. Again, holes 512 are shown for convenience and there can be any number of holes 512 and any placement. Holes 512 are placed on gasket 210 in order that rods 302 pass through them. In some embodiments, holes 512 and rods 302 are positioned to facilitate alignment of gasket 210 in stack 200 and to provide for a constant pressure across the surface of gasket 210.

Holes 504 and 501 are formed to allow passage of electrolyte, but to also seal around the corresponding electrolyte manifold to prevent leakage and mixing. Holes 508 and 506 also form around electrolyte holes in components 400 and 420, but electrolyte accesses 516 are formed to allow the flow of electrolyte from the manifold formed, in part, by holes 508 and 506 into the interior opening of gasket 210. In some embodiments, as shown in FIG. 5A, electroyte accesses 516 can provide a circuitous route for electrolyte flow in order to increase electrical resistivity and reduce shunt current between adjacent cells.

Gasket 210 is formed from a gasket forming material that will resist electrolytes 124 and 126 and allow for proper sealing between adjacent components 400 and 420. A rubber such as, for example, Santoprene provides good characteristics. Santoprene is a thermoplastic rubber that is a mixture of in-situ cross linking EPDM rubber and polypropylene. As such, Santoprene provides a high performance gasket 210 with good sealing, resistance to fluids, and temperature characteristics. As shown in FIG. 5C, Santoprene has a linear expansion with temperature that is linear after anneal. Before anneal, the linear expansion curve is non-linear. As shown in FIG. 5C, Santoprene has a different linear expansion characteristic after a thermal anneal (shown by curve A) than it does prior to a thermal expansion (shown by curve B). FIG. 5D illustrates linear expansion under pressure, where a block 560 expands in length to block 562 under pressure. Such an expansion in the material of gasket 210 may cause gasket "creep" or distortion that may adversely affect the operation of stacked cell 200.

The coefficient of linear expansion of santoprene gasket is higher as compared to the components 400 and 420. This differential linear expansion of gasket 210 with temperature and pressure may cause difficulty in keeping a proper seal through the operation of a flow cell battery utilizing stacked cell 200. Returning to FIG. 5A, gasket 210 can include relief holes 514 positioned so that the effects of linear expansion of gasket 210 is limited internally and propagation of the linear expansion is limited, as shown in FIG. 5E. The relief holes on gasket 210 are spaced such that the linear thermal expansion on the maximum contiguous length of gasket material is limited to less than $115^{th}$ the gasket thickness. (Max D=T/(5×CTE×ΔT, where D is the maximum contiguous length of the gasket material, T=Thickness of Gasket material, CTE is the coefficient of thermal expansion of the gasket material, and ΔT is the operating temperature range). With relief holes 514, which allow for expansion of the gasket material without the accompanying creep and added strain of the material, gasket 210 becomes easily cycled through operating temperatures without adversely affecting the operation of stacked cell 200.

Figure 5B:
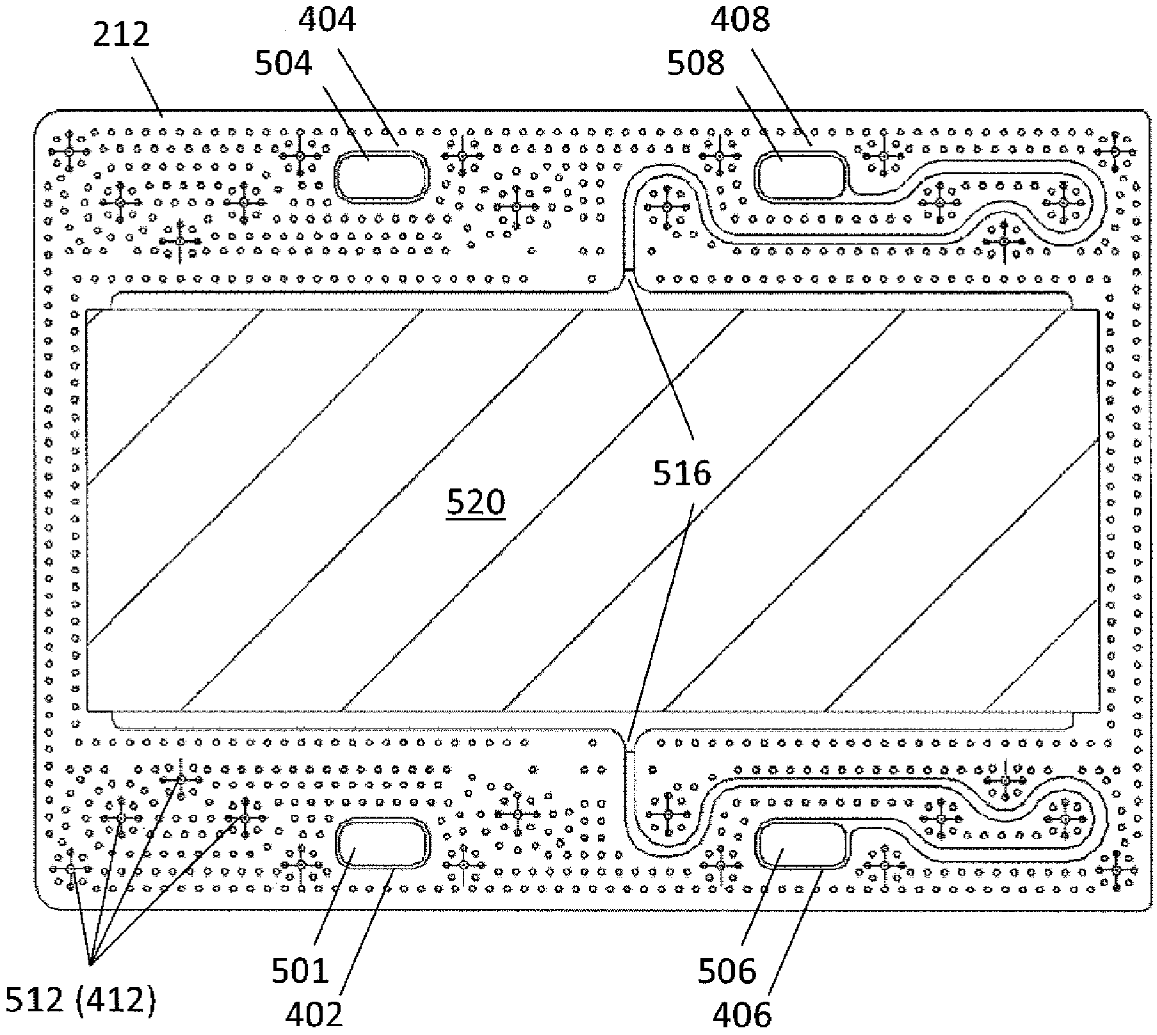
FIG. 5B illustrates the gasket of FIG. 5A matched with a component as shown in FIG. 4A.
Figure 5C:
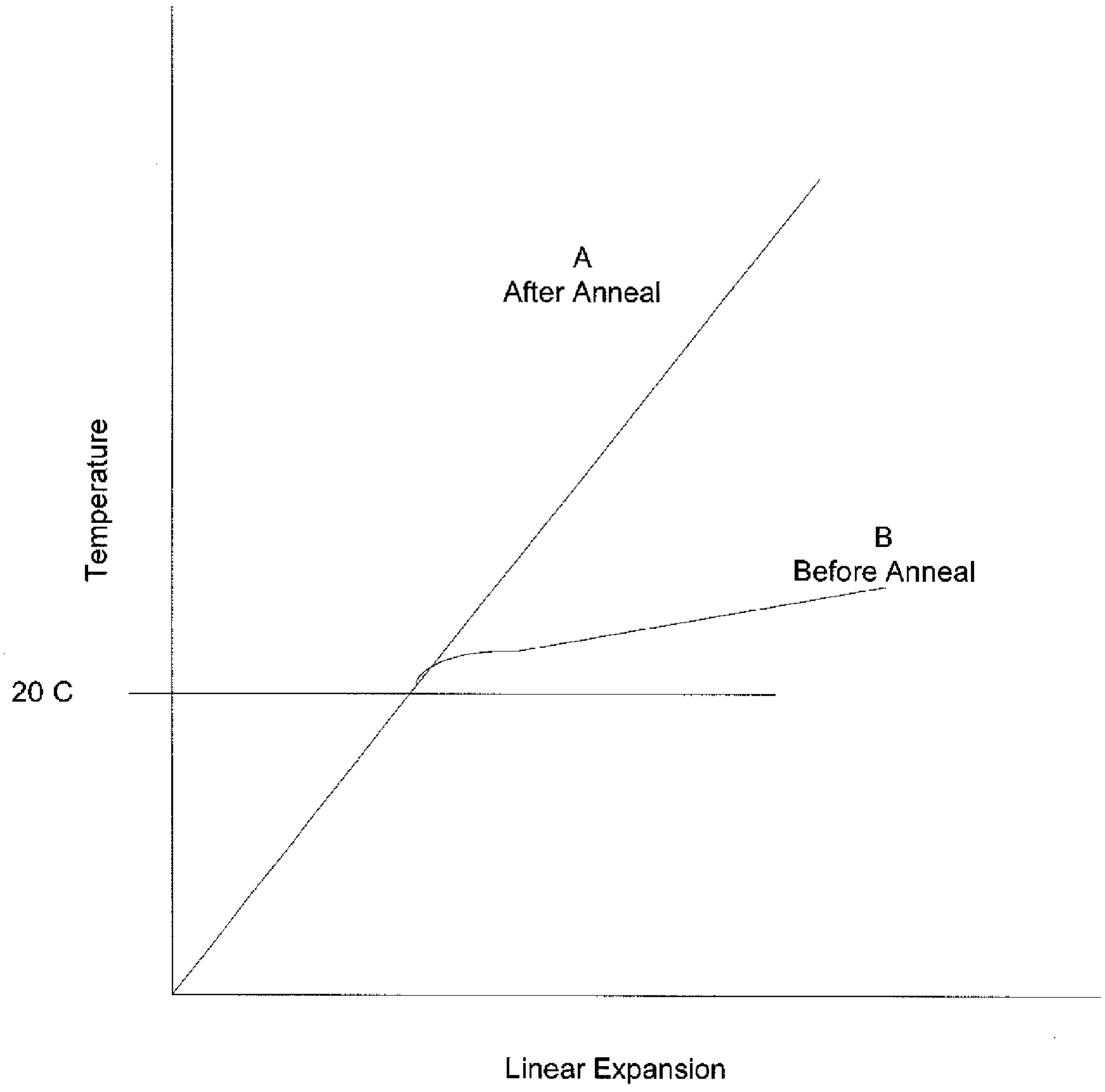
FIG. 5C illustrates the linear expansion with temperature of the gasket shown in FIG. 5A, before and after anneal.
Figure 5D:
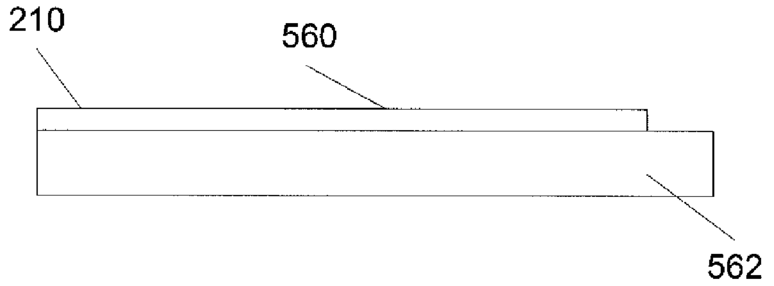
FIG. 5D illustrates the linear expansion with pressure of the gasket shown in FIG. 5A.
Figure 5E:
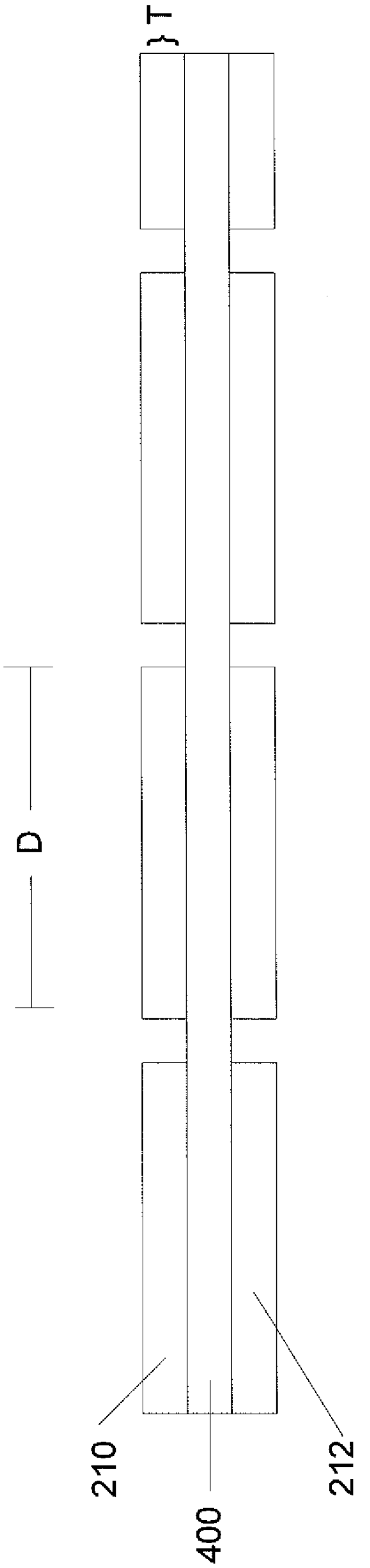
FIG. 5E illustrates the operation of expansion holes in the gasket.

FIG. 5B illustrates electrode 212 mounted on components 400 In this case, component 400 includes an electrode 520. As shown in FIG. 5B, gasket 212 is arranged to seal holes 402 and 404 while directing electrolyte fluid from holes 406 over electrode 520 through passages 516. The electrode 520 has the felt 414 attached to both sides, with a gap on the inlet and outlet flow direction. This gap facilitates spreading of the electrolyte flow uniformly across the felt, and avoids stagnant regions on the sides. For effective spreading of electrolyte across the width of the electrode, the height to width aspect ratio should be 1:2 or higher.

Figure 5F:
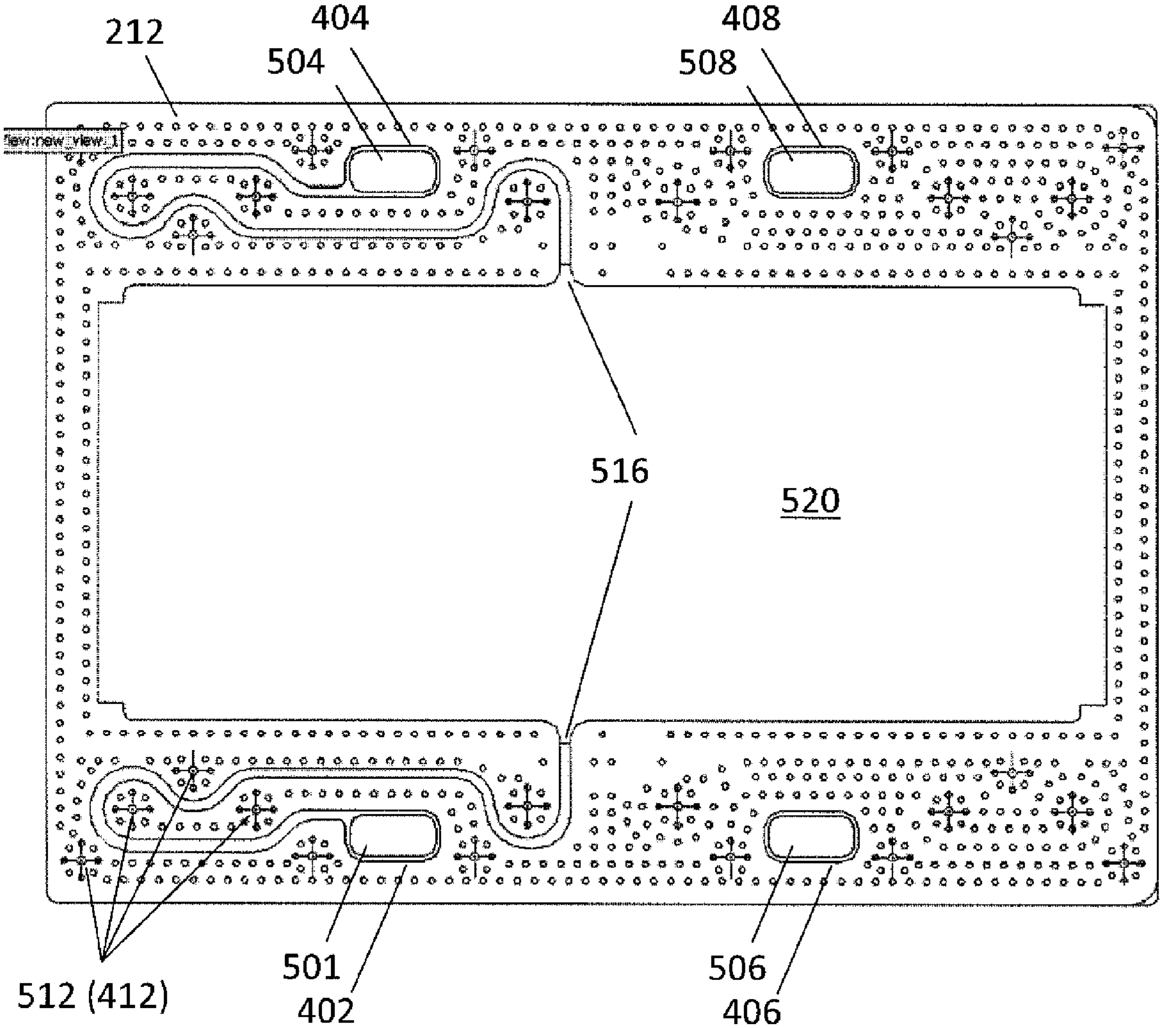
FIG. 5F illustrates a gasket of FIG. 5A matched with a component as shown in FIG. 4B.

FIG. 5F illustrates membrane 208 mounted on component 420. As shown in FIG. 5F, gasket 212 is arranged to seal holes 406 and 408 while directing electrolyte fluid from holes 402 over element 520 through passages 516.

Returning to FIG. 2, then, gaskets 210 and 212 may be identical structures that are rotated from each other to facilitate the flow of electrolytes 124 and 126 through the appropriate halves of each of cells 100-1 through 100-N. Additionally, membrane 206-1 through 206-N are formed from component 400 with membrane material mounted in area 410. Electrodes 208-1 through 208-(N−1) are also formed from component 400 with electrode material mounted in area 410. With gasket 210 and its rotated version gasket 212 defining flow characteristics, manifolds 304 and 306 are formed by gaskets 210 and 212 and holes 402 and 404 shown in component 400. Gasket 210 allows for the flow of electrolyte 124 into area 410 while preventing the flow of electrolyte 126 into that area. Conversely, in the next half cell, gasket 212 allows the flow of electrolyte 126 into area 410 of the next component 400, which is an electrode 208, while preventing the flow of electrolyte 124 into that area.

Figure 5G:
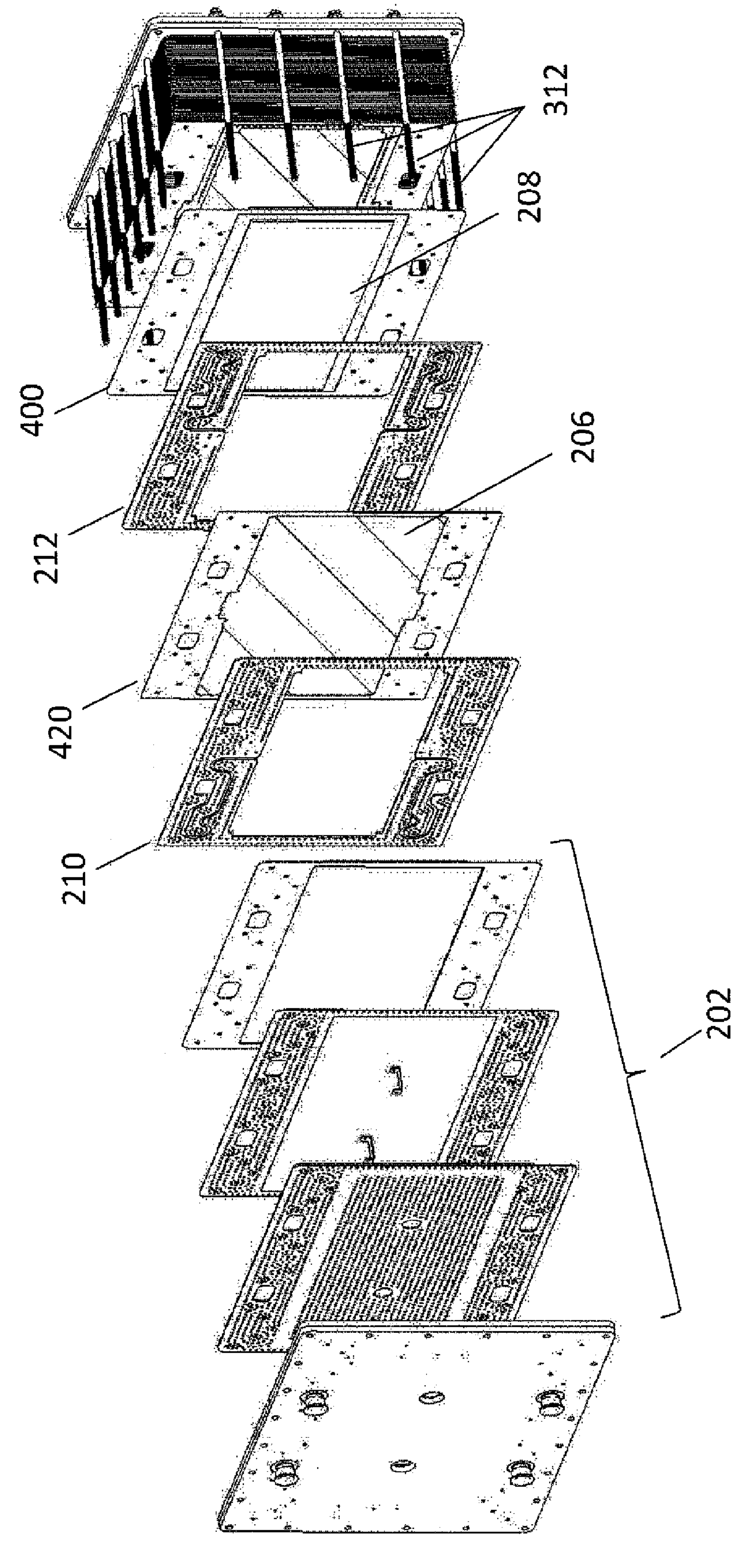
FIG. 5G illustrates a stack as shown in FIG. 2.

FIG. 5G illustrates stack 200 in blow-out form. As shown in FIG. 5G, end electrode 202 can include a pressure plate, gaskets, and electrodes. The stack is assembled as indicated below and tensioned utilizing rods 312.

Figure 6:
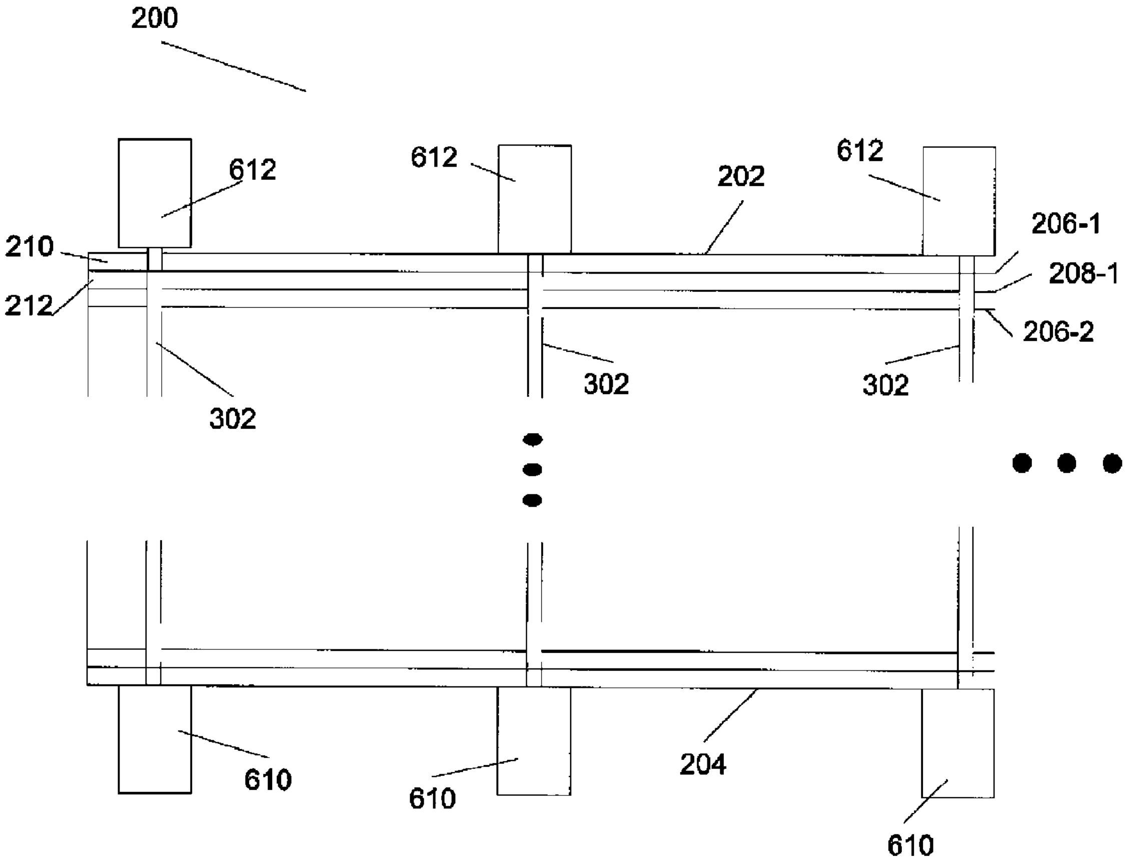
FIG. 6 illustrates construction of the stacked cell shown in FIG. 2.

FIG. 6 illustrates a cross section of stack 200 and threaded rods 312. As shown in FIG. 6, rods 302 pass through holes 412 in component 550, whether carrying an electrode 208 or membrane 206, as well as holes 512 in gaskets 210 and 212. Threaded rods 312 may be, for example, partially threaded rods that are fixed and tensioned with mounts 610 and 612. In some embodiments, mount 610 may be a nut screwed onto threaded rod 302 and a washer, or may be integrally formed with the threaded rod, as in a threaded bolt. In some embodiments, threaded rods 302 may pass through a strap that extends to all of rods 302 and held with a nut such that mount 610 includes a strap and a nut. In some embodiments mount 612 may also be formed with a washer or strap and a nut. In some embodiments, mount 612 or mount 612 and mount 610 may each include a spring tensioner.

Figure 7:
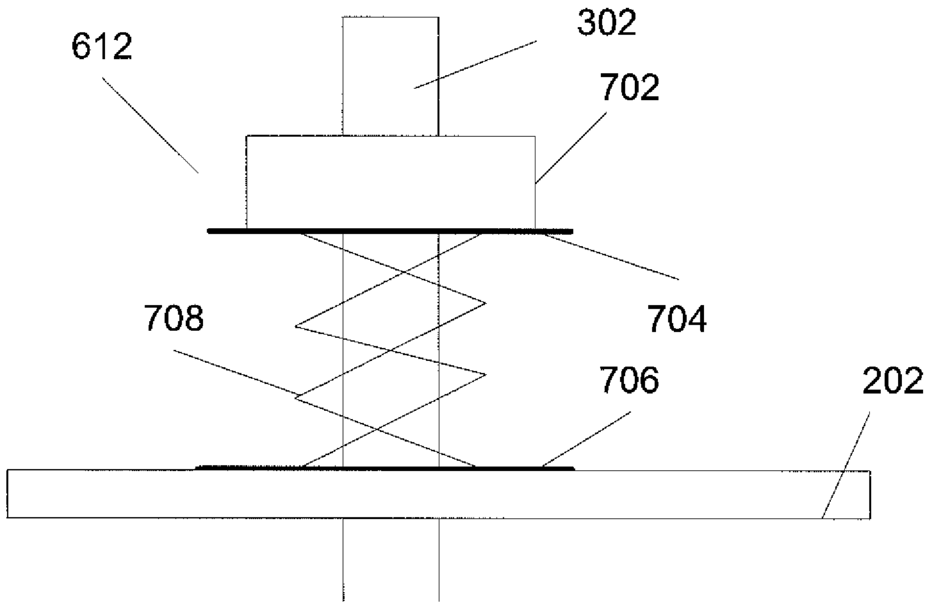
FIG. 7 illustrates a spring loaded nut utilized in the construction of the stacked cell according to some embodiments of the present invention.

An example of mount 612 is shown in FIG. 7. As shown in FIG. 7, rod 302 is held and tensioned with a nut 702. Nut 702 is tensioned against a washer 704 that applies pressure to a spring 706. Spring 708 applies pressure to electrode 202. In some embodiments a washer or strap 706 may be included between spring 708 and electrode 202. In some embodiments, mount 610 may have the same structure as mount 612.

Spring 708 helps to hold the pressure on stack 200 constant as stack 200 cycles thermally. Furthermore, spring 708 prevents a large increase in pressure that may occur as stack 200 heats up through use. The spring constant of spring 708 allows for the pressure on stack 200 to be held relatively constant while not allowing substantial movement of the components of stack 200. The spring load selection is done based on the compressive load required to maintain the sealing force on gaskets, and the number of springs used. The spring constant is determined by the total spring load required and the spring travel, which is equal to the cumulative thermal expansion of the stack components across the operating temperature range. The compressive load on the spring can be derived from $F=(P\times A\times S)/N$, where P is the fluid pressure inside the stack, A is the projected area of the gasket, S is the safety factor and N is the number of threaded rods with springs.

In the construction of stack 200, an end electrode, for example electrode 202 which includes an end gasket, end plate and pressure plate, is placed over rods 302. Then a gasket positioned as gasket 210 is placed over rods 302 onto electrode 202 followed by a component 400 configured as a membrane 206. Then a gasket positioned as gasket 212 is placed over rods 302 followed by a component 400 configured as an internal electrode 208. This process is continued until end electrode 204 which includes an end gasket, end plate and pressure plate is placed over rods 302. Mounts 612 is then utilized to fasten rods. An initial pressure is applied by mounts 612 through rods 312 to stack 200. Alignment rods 302 are removed from the stack at this stage. Stack 200 is then annealed at an initial temperature in order to help cure gaskets 210 and 212 so that the linear expansion of the gasket material is in the linear region as shown in FIG. 5C. Once cooled, stack 200 is then tensioned to its final pressure. In that fashion, the linear expansion of gaskets 210 and 212 is controlled and becomes much less problematic during operation of stack 200.

Figure 8:
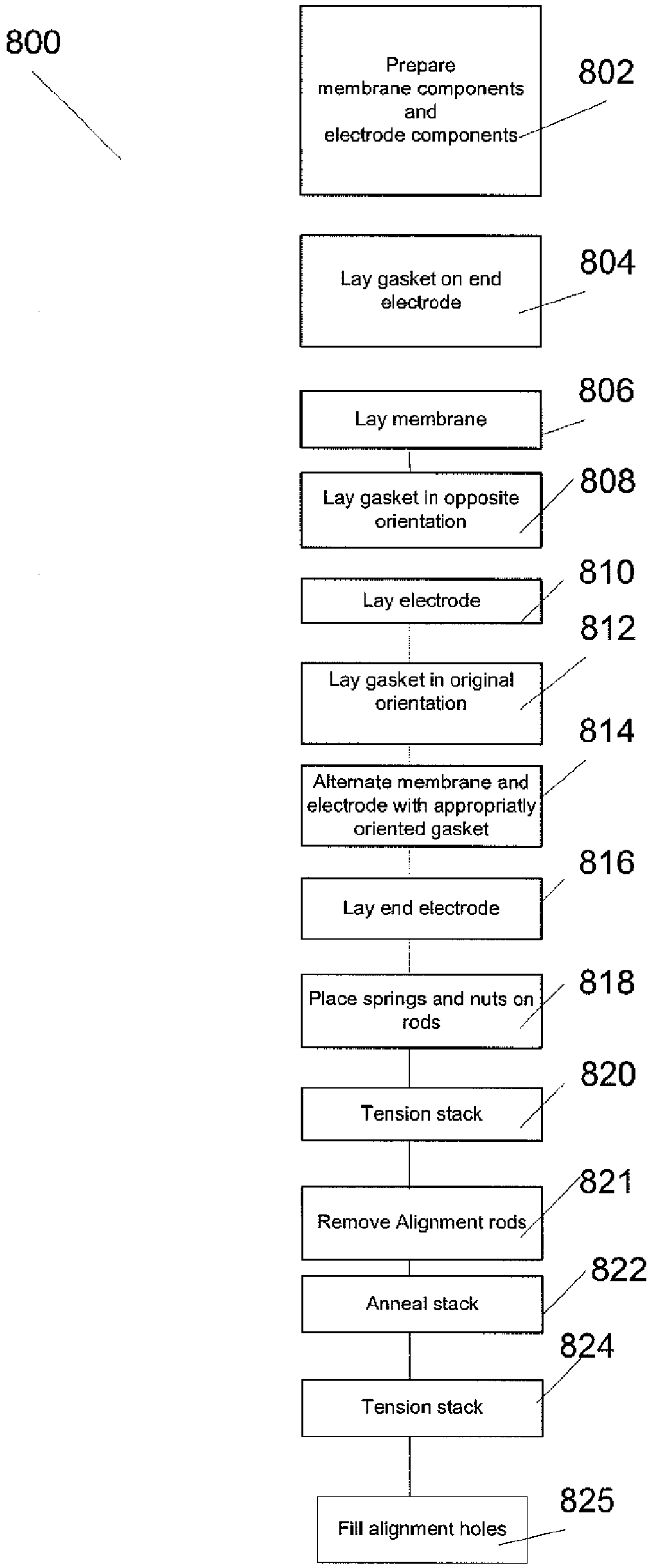
FIG. 8 illustrates a flow chart for construction of a stacked cell according to some embodiments of the present invention.

FIG. 8 illustrates a process 800 for construction of stack 200 according to some embodiments of the present invention. According to process 800, in step 802 component 400 is formed into membranes 206 or electrodes 208. In step 804, a gasket 210 is laid over an end electrode 202 utilizing rods 302 to provide for alignment and placement. In step 806, a component 400 configured as a membrane 206 is positioned over gasket 210 also utilizing rods 302. Then, in step 808 a gasket 212, which is gasket 210 rotated, is positioned again utilizing rods 302 for alignment. Following placement of gasket 212 in step 808, a component 400 configure as electrode 208 is laid utilizing rods 302. In step 812, another gasket 210 is laid over electrode 208. In step 814, steps 806 through 812 are repeated until stack 200 is completed. In step 816, end electrode 204 is laid. Then, mount 812 is attached to each of rods 302 in step 818. The stack is tensioned in step 820 to an initial pressure. In step 821, the alignment pins are withdrawn from the stack. In step 822, stack 822 is annealed to an anneal temperature and then cooled. In step 824 stack 200 is tensioned to a final tension. Finally, in step 825, the alignment rod holes are filled with an epoxy sealant.

Although stack 200 can be of any size, stack 200 may be, for example, 35"×26"×13", including 24 Cells, with 750 lbs/bolt tensioning, 20 tensioning rods, 28 alignment pins, sizes manifold of 1.5"×2.75". As such, each side has 14 alignment rods 302 arranged to position and hold the components of stack 302 in place. A load of about 250 lbs can be applied through each threaded rod 312 prior to anneal. The anneal temperature can be 130 F to 180 F. The final tension can be 750 lbs for each threaded rod with spring tensioner. In such a system, the spring constant of springs 708 is about 1020 lbs/in. As such, gaskets 210 and 212 will then travel about 0.132" over the entire stack thickness during operation of stack 200. The stack operates within a temperature range of 23 F to 150 F.

Further embodiments can be envisioned to one of ordinary skill in the art after reading this disclosure. In other embodiments, combinations or sub-combinations of the above disclosed invention can be advantageously made. The specification and drawings are, accordingly, to be regarded in an illustrative rather than restrictive sense. It will, however, be evident that various modifications and changes may be made thereunto without departing from the broader spirit and scope of the invention as set forth in the claims.

What is claimed is:

1. A stacked cell, comprising:

a first electrode component, the first electrode component having flat surfaces on both sides, electrolyte passages through the flat surfaces, and an electrode rigidly attached in an opening;

a second electrode component, the second electrode component being identical with the first electrode component;

a first gasket, the first gasket including a first electrolyte access channel formed in a first surface of the first gasket, the first electrolyte access channel coupling first electrolyte flow manifold holes formed in the first gasket to a first gasket interior opening;

a second gasket, the second gasket being identical with the first gasket rotated on an axis perpendicular to the first surface by 180° to provide a second electrolyte access channel coupling second electrolyte flow manifold holes to a second gasket interior opening; and a membrane component, the membrane component having flat surfaces on both sides, electrolyte passages through the flat surfaces, and a membrane rigidly attached in an opening, wherein the membrane component is positioned between the first electrode component and the second electrode component and separated from the first electrode component by the first gasket and separated from the second electrode component by the second gasket, wherein the electrolyte passages of the first electrode component, electrolyte passages of the second electrode component, and electrolyte passages of the membrane component are aligned with the first electrolyte flow manifold holes of the first gasket and the second electrolyte flow manifold holes of the second gasket to form first and second electrolyte manifolds, and wherein the first electrolyte access channel of the first gasket allows flow of a first electrolyte from the first electrolyte flow manifold between the first electrode component and the membrane and the second electrolyte access channel of the second gasket allows flow of a second electrolyte from the second electrolyte flow manifold between the membrane and the second electrode component;

wherein the first and second gaskets are formed of a thermoplastic rubber;

wherein each of the first and second gaskets further comprise a plurality of relief holes to limit thermal expansion in the first and second gaskets.

2. The stacked cell of claim 1, further including at least one other electrode component, the other electrode component separated from the second electrode component by a third gasket, another membrane component, and a fourth gasket, the third gasket being identical with the first gasket and the fourth gasket being identical with the second gasket.

3. The stacked cell of claim 2, where the first gasket and the second gasket are formed of a rubber compound that seals against the first electrolyte and the second electrolyte when tension is applied to the stacked cell.

4. The stacked cell of claim 1, wherein the first gasket includes a second electrolyte manifold hole, the second gasket includes a first electrolyte manifold hole, and at least one of the first electrode component or second component have fluid access holes that are aligned to form manifolds for the delivery of the first electrolyte and the second electrolyte through the stacked cell.

5. The stacked cell of claim 4, wherein the stacked cell is fixed with a plurality of rods.

6. The stacked cell of claim 5, wherein the plurality of rods holds pressure on the stacked cell in order to facilitate sealing between the first gasket and the second gasket and adjacent electrode components and membrane components.

7. The stacked cell of claim 6, wherein the plurality of rods are mounted with spring loaded mounts.

8. The stacked cell of claim 1, wherein the thermoplastic rubber is Santoprene.

9. A method of forming a stacked cell, comprising:

providing a first electrode component, the first electrode component having flat surfaces on both sides, electrolyte passages through the flat surfaces, and an electrode rigidly attached in an opening;

positioning a first gasket over the first electrode component, the first gasket including a first electrolyte access channel formed in a first surface of the first gasket, the first electrolyte access channel coupling first electrolyte flow manifold holes formed in the first gasket to a first gasket interior opening;

positioning a membrane component over the first gasket, the membrane component having flat surfaces on both sides, electrolyte passages through the flat surfaces, and a membrane rigidly attached in an opening;

positioning a second gasket over the membrane component, the second gasket being identical with the first gasket rotated on an axis perpendicular to the first surface by 180° to provide a second electrolyte access channel coupling second electrolyte flow manifold holes to a second gasket interior opening;

positioning a second electrode component over the first gasket, the second electrode component being identical with the first electrode component;

applying tension to the stacked cell;

annealing the stacked cell; and tensioning the stacked cell;

wherein the membrane component is positioned between the first electrode component and the second electrode component and separated from the first electrode component by the first gasket and separated from the second electrode component by the second gasket, wherein the electrolyte passages of the first electrode component, electrolyte passages of the second electrode component, and electrolyte passages of the membrane component are aligned with the first electrolyte flow manifold holes of the first gasket and the second electrolyte flow manifold holes of the second gasket to form first and second electrolyte manifolds, and wherein the first electrolyte access channel of the first gasket allows flow of a first electrolyte from the first electrolyte flow manifold between the first electrode component and the membrane and the second electrolyte access channel of the second gasket allows flow of a second electrolyte from the second electrolyte flow manifold between the membrane and the second electrode component;

wherein the first and second gaskets are formed of a thermoplastic rubber;

wherein each of the first and second gaskets further comprise a plurality of relief holes to limit thermal expansion in the first and second gaskets.

10. The method of claim 9, wherein the first gasket and the second gasket are formed of Santoprene.

11. The method of claim 9, wherein the stacked cell includes a number N of individual cells, each cell being formed by two electrodes and a membrane separated by gaskets.

12. The method of claim 9 wherein applying tension and tensioning the stacked cell include tightening a plurality of spring-loaded mounts on rods positioned through the stacked cell.

13. The method of claim 12, wherein positioning includes placing over the rods.

14. The method of claim 9, wherein the first gasket and the second gasket facilitate appropriate flow of electrolytes through the stacked cell.

* * * * *